United States Patent [19]

Merkelbach

[11] Patent Number: 4,880,281
[45] Date of Patent: Nov. 14, 1989

[54] WHEEL BEARING

[75] Inventor: Boy Merkelbach, Utrecht, Netherlands

[73] Assignee: SKF Industrial Trading & Development Co. B.V., Nieuwegein, Netherlands

[21] Appl. No.: 230,240

[22] Filed: Aug. 4, 1988

Related U.S. Application Data

[63] Continuation of Ser. No. 866,475, May 23, 1986, abandoned, which is a continuation of Ser. No. 664,168, Oct. 24, 1986, Pat. No. 4,621,700.

[30] Foreign Application Priority Data

Dec. 8, 1983 [NL] Netherlands ............... 8304240

[51] Int. Cl.⁴ ..................... F16C 33/58; F16C 33/64
[52] U.S. Cl. ........................... 301/124 R; 384/492
[58] Field of Search ........... 301/105 R, 124 R, 124 H, 301/126, 131; 180/258, 259; 384/492, 625; 219/10.75; 29/149.5 PM

[56] References Cited

U.S. PATENT DOCUMENTS

| | | | |
|---|---|---|---|
| 2,155,667 | 4/1939 | Le Jeune | 301/6 S |
| 3,445,909 | 5/1969 | Beebe, Jr. | 29/149.5 PM |
| 3,492,120 | 1/1970 | Haller | 29/149.5 PM X |
| 3,782,794 | 1/1974 | Chmura et al. | 384/492 |
| 3,914,572 | 10/1975 | Jensen | 219/10.75 X |
| 4,295,686 | 10/1981 | Black | 301/105 R X |
| 4,371,214 | 2/1983 | Strader | 301/126 |
| 4,372,628 | 2/1983 | Kiener | 384/476 |
| 4,472,616 | 9/1984 | Maurice et al. | 219/10.75 X |
| 4,481,397 | 11/1984 | Maurice et al. | 219/10.75 X |
| 4,599,502 | 7/1986 | Khare et al. | 219/10.75 X |
| 4,621,700 | 11/1986 | Merkelbach | 384/492 X |

FOREIGN PATENT DOCUMENTS

| | | | |
|---|---|---|---|
| 0137621 | 8/1983 | Japan | 384/492 |
| 1224300 | 3/1971 | United Kingdom | 384/476 |

Primary Examiner—Russell D. Stormer
Attorney, Agent, or Firm—Eugene E. Renz, Jr.

[57] ABSTRACT

A wheel bearing device with a built-in homokinetic coupling, including a generally annular inner part, an outer race and two rows of rolling elements located between the outside running surfaces formed on the outer race and the inside running surfaces applied to the inner part. The outer race is equipped with a radially extending flange for the attachment of the bearing, and the annular inner part is equipped with a radially extending flange to which the hub of a wheel can be attached. This inner part forms at the same time one unit with the outer ring of the homokinetic coupling characterized by the fact that the flange of the inner part is extended with a brake element which forms the part to be braked of a braking mechanism. The inner part of the bearing, the carrier flange for the wheel, the brake element and the outer ring of the homokinetic coupling forms one homogeneous unit. The inner raceway surfaces for the rolling elements are formed of a high grade bearing material. The inner part has an axial stub directed away from the homokinetic coupling and extending beyond the attachment flange to define a guide means for the hub of the wheel.

2 Claims, 2 Drawing Sheets

WHEEL BEARING

This is a continuation of application Ser. No. 866,475 filed on May 23, 1986 entitled WHEEL BEARING, now abandoned, which is a continuation of Ser. No. 664,168, filed Oct. 24, 1986, which issued as U.S. Pat. No. 4,621,700 on Nov. 11, 1986 entitled WHEEL BEARING.

FIELD OF THE INVENTION

This invention relates to wheel bearings which are used with a brake element.

BACKGROUND OF THE INVENTION

The invention concerns a wheel bearing with a built-in homokinetic coupling, including a generally annular inner part, an outer race and two rows of rolling elements located between the outside running surfaces formed on the outer race and the inside running surfaces applied to the inner part, whereby the outer race is equipped with a radially extending flange for the attachment of the bearing, and the annular inner part is equipped with a radially extending flange to which the hub of a wheel can be attached, and whereby this inner part forms at the same time one unit with the outer ring of the homokinetic coupling. A similar wheel bearing is known from the British Patent No. 1,416,989.

In a bearing of this type the homokinetic coupling forms in essence one unit with the wheel bearing, so that it is no longer necessary to attach the homokinetic coupling to the bearing, which is particularly difficult on account of the high level of precision required. However, all other wheel accessories, such as brake elements, still need to be attached separately.

SUMMARY AND DESCRIPTION OF THE INVENTION

The purpose of the invention is to produce a wheel bearing of the type mentioned, whereby the attachment of the separate components belonging to the wheel construction, and the mutual adjustment of these components, are reduced to a minimum.

This purpose is achieved by the fact that, in the wheel bearing according to the invention, the flange of the inner race has been extended with a brake element which forms the part to be braked of a braking mechanism, so that the generally annular inner part of the bearing, the carrier flange for the wheel, the brake element and the outer ring of the homokinetic coupling form one homogeneous unit.

Because the running surfaces for the rolling elements have to consist of a high-grade material in order to obtain a bearing with an acceptable lifespan, the whole inner part of the known bearing in which the inside running surfaces are formed in the outer circumferential surface of the inner part, consists of a high-grade material.

A particularly desirable material of the high-grade needed for this invention is that which is described in the American Society of Testing Materials designation A 295-84 which is a standard specification for high-carbon ball and roller bearing steel. The chemical requirements for various steel compositions is set forth in Tabel I below. Any steel which has properties similar to or better than those listed in Table I are suitable high-grade materials for use in this invention.

TABLE I

| Element | Grade (composition, weight %) | | |
|---|---|---|---|
| | ASTM 52100 | ASTM 51100 | ASTM 5195 |
| Carbon | 0.98–1.10 | 0.98–1.10 | 0.90–1.03 |
| Manganese | 0.25–.45 | 0.25–.45 | 0.75–1.00 |
| Phosphorus (max) | 0.025 | 0.025 | 0.025 |
| Sulfur (max) | 0.025 | 0.025 | 0.025 |
| Silicon | 0.15–.35 | 0.15–.35 | 0.15–.35 |
| Chromium | 1.30–1.60 | 0.90–1.15 | 0.70–.90 |
| Nickel (max) | 0.25 | 0.25 | 0.25 |
| Copper (max) | 0.35 | 0.35 | 0.35 |
| Molybdenum (max) | 0.10 | 0.10 | 0.10 |

Thus, in the bearing according to the invention where also a brake element forms one unit with the inner part, this brake element, too, would have to consist of a high-grade material, which would make the entire wheel bearing relatively expensive.

Because the brake element itself does not have to consist of a high-grade material, the invention provides that, in a favorable manner, the inner part of the bearing is manufactured from a material which meets less high demands, and that the inside running surfaces formed in the outer circumferential face of the inner part undergo a treatment in such manner that a surface layer of a high-grade material is formed.

A preferred method for hardening or tempering a portion of the running surfaces as contemplated herein as accomplished by the use of electromagnetic induction. The process comprises the steps of supplying an alternating current flow through an inductor or working coil to establish a highly concentrated, rapidly alternating magnetic field within a coil. The strength of the field is, of course, dependent primarily upon the magnitude of current flowing in the coi. This magnetic field induces an electric potential in the part which is being heated and as the part represents a part of the closed circuit, the induced voltage causes the flow of current. High-frequency current is generally used when shallow heating is the goal. Intermediate and low frequencies are used for deeper heating. As the surface is treated by this induction heating process, the surface becomes hardened so as to increase the wear resistance and improve fatigue strength. For the purposes of this invention, a shallow, hardened case may be applied to depths from less than 0.010 inches to greater than 0.060 inches. The heating to accomplish this employs frequencies from less than 10 kilocycles/sec to more than 2 megacycles/sec. This process is well known in the art of metal hardening and tempering. For further reference to the conventional method of heat treating as described herein, reference is made to the *Metals Handbook,* 8th Edition, 1964, published by the American Society for Metals, Metals Park, Ohio.

It is also possible, according to the invention, for the inside running surfaces for the rolling elements to be formed in a separate ring of a high-grade material, which is attached around the annular inner part. In this manner the inner part, together with the flange and the brake element with which it forms one unit, may also be manufactured from a material of lesser quality; in addition, this yields the advantage that, in case of bearing defects, the bearing can be replaced in a simple manner.

Due to the fact that, this way, the inner part may be manufactured from a relatively cheap material, the inner part may be equipped in a favorable manner with an axial stub, directed away from the homokinetic coupling and extending beyond the flange for attachment, in the form of a guiding element for the wheel rim.

It should be noted that, from the British Patent No. 1,454,398, a wheel bearing is known with two rows of rolling elements which are contained between an inner and an outer race, and whereby the inner race forms one unit with the flange for the attachment of a wheel and a brake element. However, no homokinetic coupling has been built into the wheel bearing, so that the inner race is simple in construction.

BRIEF DESCRIPTION OF THE DRAWINGS

The invention is further described with reference to the models of execution shown in the drawings, wherein.

DETAILED DESCRIPTION OF THE PREFERRED EMBODIMENT

Figure 1:
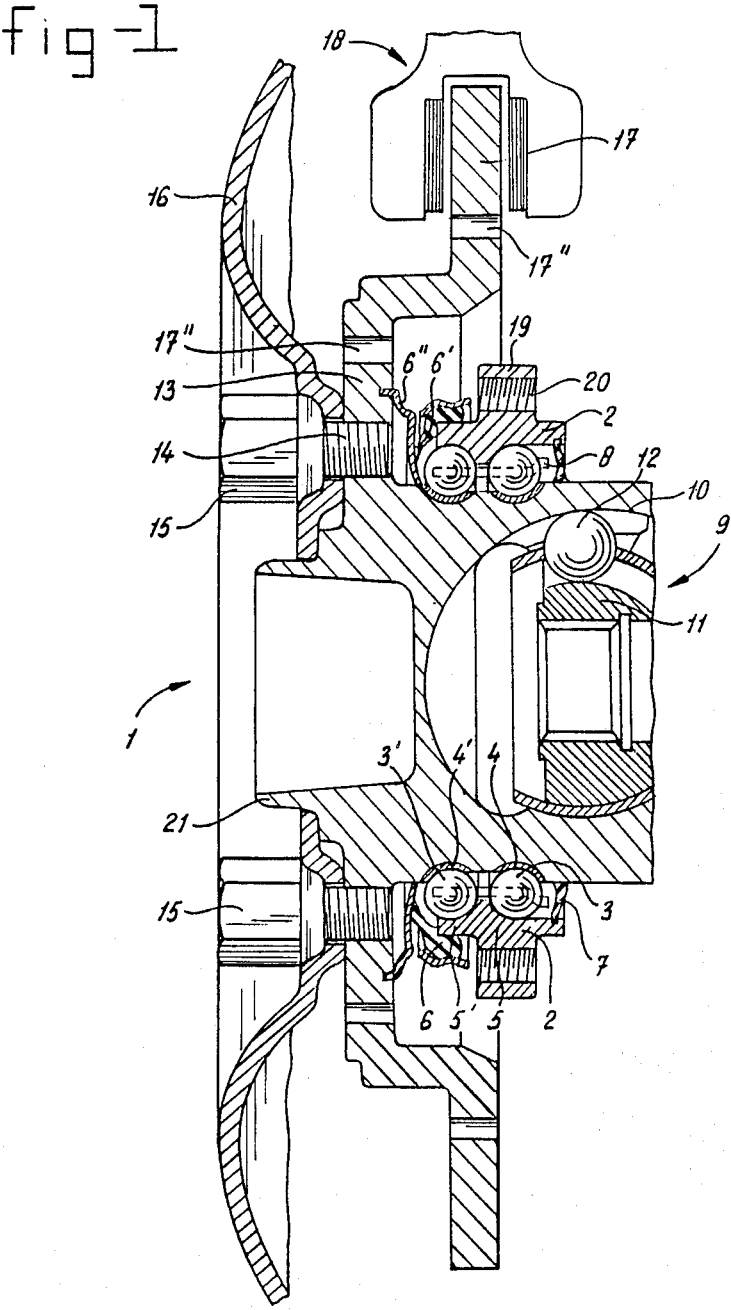
FIG. 1 shows an axial section of a wheel bearing according to the invention.

As shown in FIG. 1, the wheel bearing contains a generally annular inner part 1 and an outer race 2 and---located between these parts 1 and 2--two rows of rolling elements 3,3' which rest, on the one side, against the inside trajectories 4, 4' formed in the outer circumferential wall of the inner part 1 and, on the other side, against the running surfaces 5,5' formed in the outer race 2. Furthermore, seals 6 and 7 have been applied, whereby seal 6 forms a seal with the lip-shaped endings 6' against an annular element 6" attached to the flange 13. The following elements 3 are furthermore separated from one another by means of a flexible cage 8.

In a cavity of the inner part 1, a homokinetic coupling 9 is formed so that the extending part 10 of the inner part 1 forms the outer ring of this coupling. The homokinetic coupling 9 includes furthermore the inner ring 11 to be driven, and a number of driving balls 12, each of which is contained in channels in the outer ring 10 or the inner ring 11, respectively.

The inner part 1 is furthermore equipped with a radially extending flange 13, which has a number of openings 14 equipped with female threads, so that by means of the bolts 15 the hub 16 of a wheel can be attached to the flange 13. The flange 13 is extended outwardly with part 17 which forms the part to be braked of a braking mechanism 18 which, in the model of execution shown, is a disk-brake mechanism. The disk 17 is furthermore equipped with air gaps 17" which serve to dissipate the heat generated during braking.

The outer race 2 is equipped with a radially extending flange 19 which has openings 20 for attaching the bearing.

The inner part 1 is furthermore equipped with an axially extending hollow stub 21 which serves to guide and align the wheel hub 16.

The model of execution shown in FIG. 1 includes the inner part 1 with stub 21, the outer ring 10, flange 13 and brake element 17, consisting of one homogeneous unit and manufactured from a lower-grade material than is required for the bearings themselves. However, the inner running surfaces 4,4' have undergone a treatment so that in the area of these surfaces a layer of high-grade material has been formed. The inside running surfaces formed on the outer cicumferential wall of the inner part 1 can, for example, be coated with a material of a higher grade which is subsequently subjected to a hardening and polishing process, so that at least this part of the entire unit will meet the demands placed upon a pivot bearing. High-grade materials such as those described in Table I are admirably suited for this purpose. The hardening process which is preferred is the previously mentioned induction hardening process. After hardening, of course, the surface can be polished or smoothed as appropriate.

Figure 2:
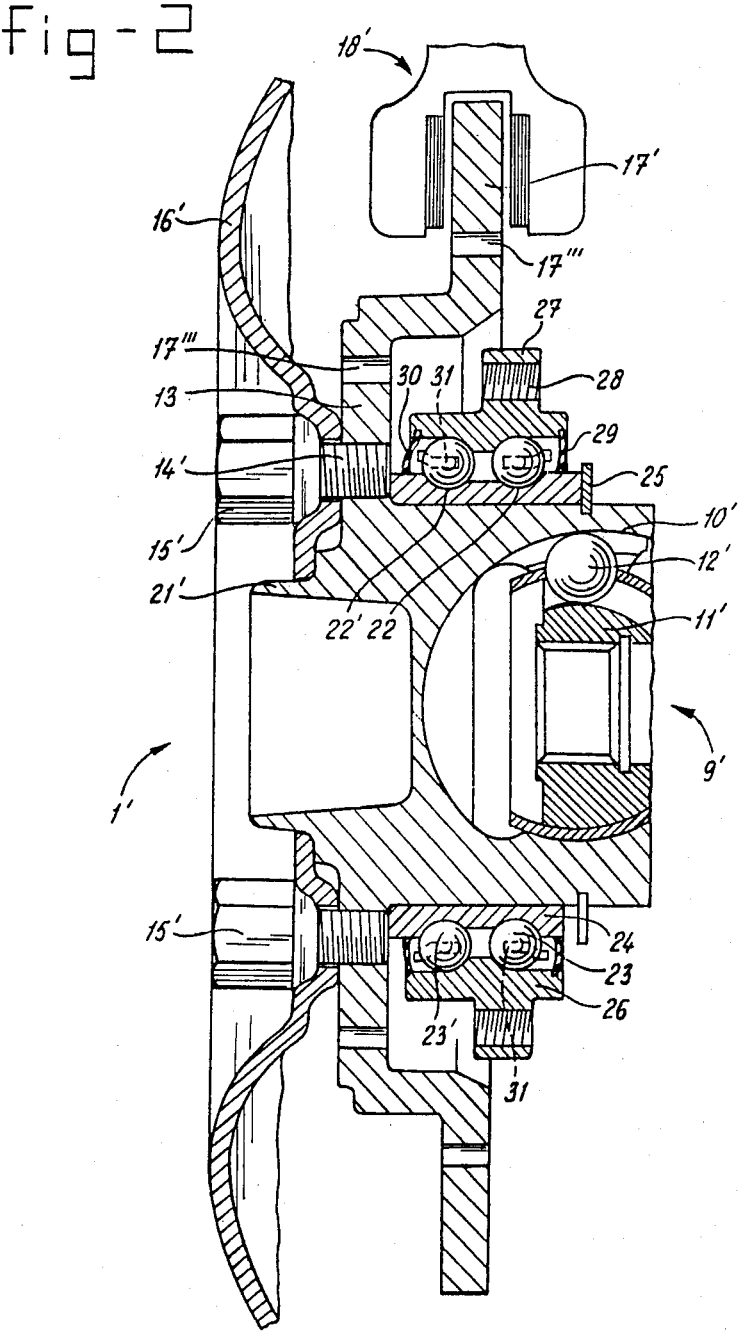
FIG. 2 shows an axial section of another model of execution of the wheel bearing according to the invention.

In the model of execution shown in FIG. 2, the components which correspond to the model of execution according to FIG. 1, are indicated with the same reference numbers, but with the addition of the prime symbol.

The model of execution according to FIG. 2 differs from the one according to FIG. 1 only in that the inner running surfaces 22,22' for the rolling elements 23, 23' are formed in a separate inner race 24, which has been applied around the outer circumferential wall of the inner part 1' and fastened in place with the retaining ring 25. This inner race 24 is surrounded by an outer race 26 which is equipped with a radially extending flange 27 with openings 28 for coupling the unit to the wheel and steering mechanism suspension. In addition, there are seals 29, 30 between the outer race 26 and the inner race 24, and the rolling elements 23, 23' are contained in a cage 31. This way, an easily removable bearing part is obtained, so that the bearing can be replaced in a simple manner in case of bearing defects. Otherwise, the model of execution according to FIG. 2 corresponds to the one according to FIG. 1.

What is claimed is:

1. A wheel bearing device with a built-in homokinetic coupling having an outer ring, including a generally annular inner part having inside running surfaces, an outer race having outside running surfaces and two rows of rolling elements located between said outside running surfaces and said inside running surfaces, whereby the outer race is equipped with a radially extending flange for the attachment of the bearing, and the annular inner part is equipped with a radially extending flange to which the hub of a wheel can be attached, and whereby the inner part forms at the same time one unit with said outer ring of the homokinetic coupling characterized by the fact that the flange (13,13') of the inner part (1,1') is extended with a brake element (17,17") which forms the part to be braked of a braking mechanism (18,18') and said inner part having an axial stub (21,21') directed away from the homokinetic coupling (9,9') and extending beyond the attachment flange (13,13') to define a guide means for the hub (16,16') of the wheel, so that the inner part (1,1') of the bearing, the carrier flange (13,13') for the wheel, the brake element (17,17') and the outer ring (10,10') of the homokinetic coupling (9,9') and the axial stub (21,21') forms one homogeneous unit manufactured from a material unsuitable for bearing use, the inner raceway surfaces being formed by coating said surface with a high grade material which is then hardened by induction hardening.

2. The device of claim 1, wherein said inner raceway surfaces are hardened to a depth ranging from about 0.010 inches to about 0.060 inches.

* * * * *